United States Patent
Gebraad

(10) Patent No.: US 12,037,985 B2
(45) Date of Patent: Jul. 16, 2024

(54) CONTROLLING WIND TURBINES IN PRESENCE OF WAKE INTERACTIONS

(71) Applicant: Siemens Gamesa Renewable Energy A/S, Brande (DK)

(72) Inventor: Pieter M. O. Gebraad, København (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 741 days.

(21) Appl. No.: 15/734,804

(22) PCT Filed: Jun. 4, 2019

(86) PCT No.: PCT/EP2019/064415
§ 371 (c)(1),
(2) Date: Dec. 3, 2020

(87) PCT Pub. No.: WO2019/233979
PCT Pub. Date: Dec. 12, 2019

(65) Prior Publication Data
US 2021/0231103 A1 Jul. 29, 2021

(30) Foreign Application Priority Data

Jun. 8, 2018 (EP) ..................... 18176703

(51) Int. Cl.
*F03D 7/04* (2006.01)
*F03D 7/02* (2006.01)

(52) U.S. Cl.
CPC .......... *F03D 7/048* (2013.01); *F03D 7/0284* (2013.01); *F03D 7/049* (2023.08); *F03D 7/0224* (2013.01);
(Continued)

(58) Field of Classification Search
CPC .......... F03D 7/048; F03D 7/049; F03D 7/028; F03D 7/0284; F03D 7/0224;
(Continued)

(56) References Cited

U.S. PATENT DOCUMENTS

| 7,357,622 | B2 | 4/2008 | Corten et al. | |
| 9,420,528 | B2 * | 8/2016 | Madan | H04W 16/14 |

(Continued)

FOREIGN PATENT DOCUMENTS

| CN | 101413483 A | 4/2009 |
| CN | 105041572 A | 11/2015 |

(Continued)

OTHER PUBLICATIONS

Gebraad, Pieter Marinus Otto, "Data-driven wind plant control,"—PhD dissertation, TU Delft, Dec. 1, 2014; Section 5.5. Application of the FLORIDyn model for optimized yaw control https://repository.tudelft.nl/islandora/object/uuid:5c37b2d7-c2da-4457-bff9-f6fd27fe8767/datastream/OBJ#page=132; 167 pages.

(Continued)

*Primary Examiner* — M. N. Von Buhr
(74) *Attorney, Agent, or Firm* — Schmeiser, Olsen & Watts LLP

(57) ABSTRACT

A method for controlling at least one considered wind turbine in a wind park, including: determining, based on a wind condition, in particular wind direction, whether another wind turbine is in a wake region caused by the considered wind turbine; if another wind turbine is the closest wind turbine in the wake region and if the other wind turbine is in an operable state, applying a first control setting to the considered wind turbine; if the other wind turbine is in a non-operable state applying a second control setting to the considered wind turbine, wherein the first control setting is based on wind park level optimisation and the second (Continued)

Figure 1:
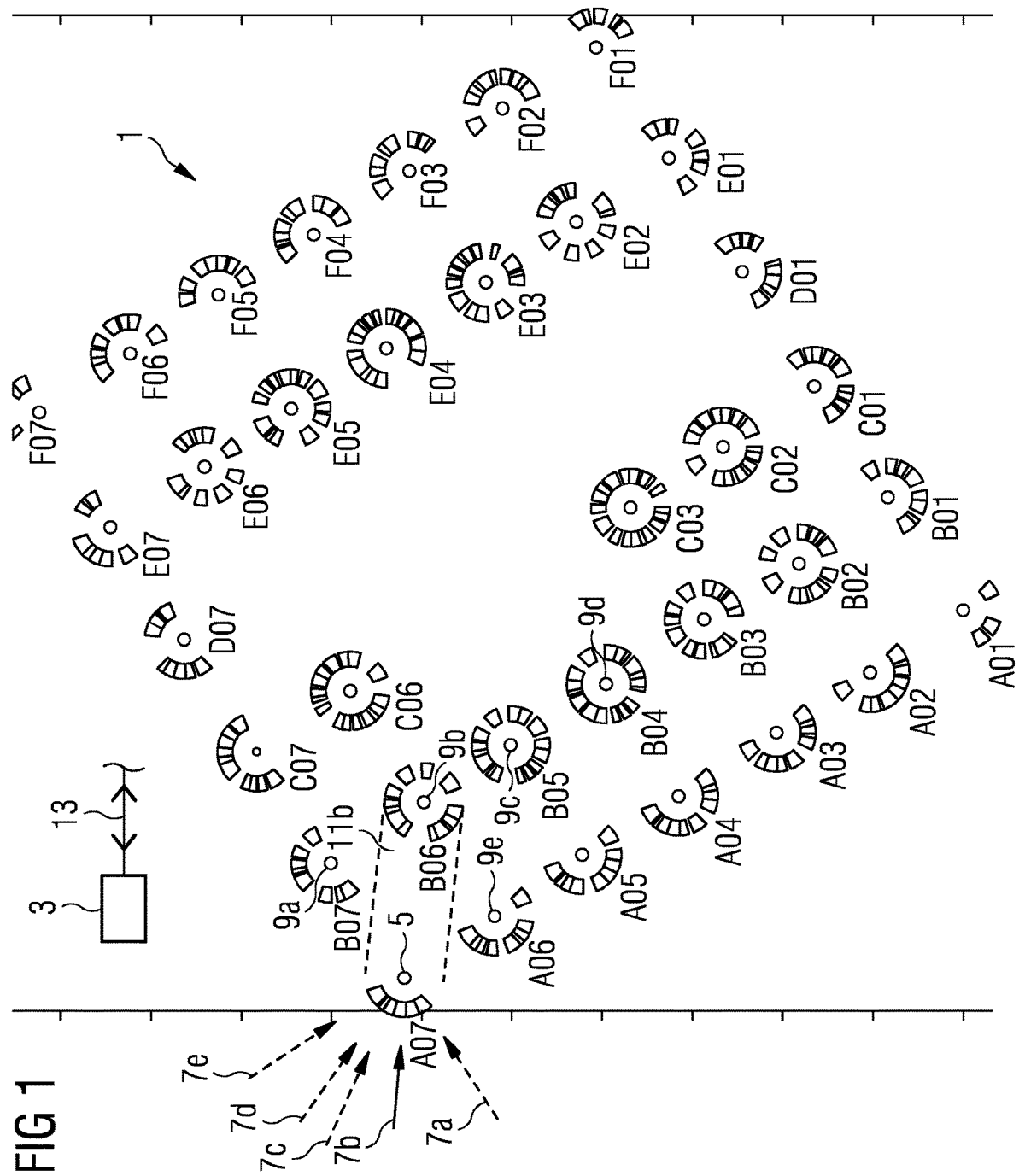

control setting is based on wind turbine level optimisation is provided.

15 Claims, 2 Drawing Sheets

(52) U.S. Cl.
CPC ..... *F05B 2270/32* (2013.01); *F05B 2270/321* (2013.01); *F05B 2270/328* (2013.01); *F05B 2270/329* (2013.01); *F05B 2270/331* (2013.01); *F05B 2270/335* (2013.01)

(58) Field of Classification Search
CPC .............. F03D 7/0264; F05B 2270/32; F05B 2270/321; F05B 2270/328; F05B 2270/329; F05B 2270/331; F05B 2270/335; F05B 2270/204; Y02E 10/72
See application file for complete search history.

(56) References Cited

U.S. PATENT DOCUMENTS

| | | | |
|---|---|---|---|
| 9,512,820 | B2 | 12/2016 | Obrecht |
| 10,101,730 | B2* | 10/2018 | Wenzel ................ G05B 19/418 |
| 10,190,793 | B2* | 1/2019 | Drees ........................ F24F 11/64 |
| 10,371,124 | B2* | 8/2019 | Wilson .................... F03D 17/00 |
| 10,385,829 | B2* | 8/2019 | Wilson .................... F03D 7/028 |
| 10,605,229 | B2* | 3/2020 | Zhang ....................... H02P 9/04 |
| 10,648,454 | B2* | 5/2020 | Miranda .............. G05B 19/042 |
| 11,487,277 | B2* | 11/2022 | Turney ............... G06Q 30/0206 |
| 2009/0099702 | A1 | 4/2009 | Vyas et al. |
| 2009/0299780 | A1 | 12/2009 | Sarkar et al. |
| 2012/0133138 | A1 | 5/2012 | Sørensen et al. |
| 2013/0166082 | A1 | 6/2013 | Ambekar et al. |
| 2013/0300115 | A1 | 11/2013 | Seem et al. |
| 2014/0234103 | A1 | 8/2014 | Obrecht |
| 2015/0308413 | A1* | 10/2015 | Bhaskar ................. F03D 9/257 290/44 |
| 2015/0308416 | A1 | 10/2015 | Ambekar et al. |
| 2016/0146190 | A1 | 5/2016 | Ravindra et al. |
| 2016/0230741 | A1 | 8/2016 | Brath et al. |
| 2017/0356421 | A1* | 12/2017 | Petitjean .............. G05B 19/042 |
| 2018/0238303 | A1 | 8/2018 | De Boer et al. |
| 2018/0340702 | A9* | 11/2018 | Turney ..................... F24F 11/46 |

FOREIGN PATENT DOCUMENTS

| | | |
|---|---|---|
| CN | 105556117 A1 | 5/2016 |
| EP | 2063108 A2 | 5/2009 |
| EP | 2128438 A2 | 12/2009 |
| EP | 2405133 A2 | 1/2012 |
| EP | 2767710 A2 | 8/2014 |
| EP | 3023636 A1 | 5/2016 |
| EP | 3037657 A1 | 6/2016 |
| EP | 3159537 A1 | 4/2017 |
| EP | 3533997 A1 | 9/2019 |
| EP | 3536948 A1 | 9/2019 |
| WO | 2017042191 A1 | 3/2017 |

OTHER PUBLICATIONS

Gebraad, P.M.O. et al., "Windturbine wake estimation and control using FLORIDyn, a control-oriented dynamic wind blant model," 2015 American Control Conference (ACC), pp. 1702-1708, XP055413503, DOI: 10.1109/ACC.2015.7170978, ISBN: 978-1-4799-8684-2, the whole document; 2015; 7 pages.
International Search Report and Written Opinion in corresponding PCT Patent Application No. PCT/EP2019/064415, dated Sep. 11, 2019. 14 pages.
Extended European Search Report in corresponding European Patent Application No. 18176703.9 dated Nov. 28, 2018. 6 pages.
Katic, I. et al. "A Simple Model for Cluster Efficiency", In W. Palz, & E. Sesto (Eds.), EWEC'86. Proceedings. vol. 1 (pp. 407-410). A. Raguzzi.

* cited by examiner

CONTROLLING WIND TURBINES IN PRESENCE OF WAKE INTERACTIONS

CROSS-REFERENCE TO RELATED APPLICATIONS

This application claims priority to PCT Application No. PCT/EP2019/064415, having a filing date of Jun. 4, 2019, which is based off of European Patent Application No. 18176703.9, having a filing date of Jun. 8, 2018, the entire contents both of which are hereby incorporated by reference.

FIELD OF THE TECHNOLOGY

The following relates to a method and to an arrangement for controlling at least one considered wind turbine in a wind park comprising plural wind turbines and relates further to a wind park comprising the control arrangement.

BACKGROUND

A wind park comprises plural wind turbines. Some wind turbines are located downstream of other wind turbines, depending on the wind direction. The upstream wind turbines reduce the wind speed and wind energy experienced by the downstream wind turbines. A wind shadow region downstream or behind an upstream wind turbine may also be referred to as a wake region.

In order to reduce production losses caused by wind turbine wakes in wind farms, optimized blade pitch, rotor speed, power production set-points, rotor tilt and/or yaw offsets or other control settings on the wind turbines can be used. When a wind turbine wakes another one or more other wind turbines, the upstream wind turbine may adapt its control settings to reduce wake-induced loads or optimized total production of the wind farm. These optimized settings are most commonly based on wind farm models that assume knowledge of the wind conditions coming into the wind farm and the layout of the wind farm. Generally, the optimization settings are based on the situations when all wind turbines are in operation.

In a conventional control system for optimizing power output or load of the entire wind park, the respective upstream turbines are controlled, implicitly assuming that the respective downstream wind turbines in the wake regions are running, thus producing electric energy. Maintenance or errors might however cause some turbines in the wind farm to be stopped. In that case, these settings are not optimal anymore and some adaptations can be used to improve performance; i.e. the upstream turbines have to adapt the control settings to the situation that a downstream turbine is stopped.

Conventionally, for taking into account one or more stopped wind turbines, a dedicated model-based optimization problem for each particular situation with one or more stopped wind turbines may have been applied in order to find the optimal wind turbine control setting for this situation. This conventionally applied solution is quite computationally expensive and complex. Therein, each combination of stopped and operating turbine requires solving a separate optimization problem (for each wind condition). In large wind farms with a large number of turbines (N), there can be a very large number of possible combinations of stopped and operating turbines (theoretically, $2^N$ possible combinations). To adapt to all possible combinations of stopped and operating wind turbines would require solving a very large number of optimization problems. For example, in the case of a wind farm with 20 wind turbines, it would theoretically require solving $2^{20}=1048576$ optimization problems for just one particular wind condition (e.g. one combination of wind direction and wind speed). Thus, conventionally applied methodologies are not suitable to arrive at a simple, time-saving control method.

Thus, there may be a need for a control method and respective arrangement, which is computationally not expensive and can result in the respective control setting in a reasonable time, thereby improving optimal power production and/or load, in particular by a control method that can be implemented in a simple manner, ensuring reliable performance.

SUMMARY

According to an embodiment of the present invention it is provided a method for controlling at least one considered wind turbine in a wind park, comprising: determining, based on a wind condition, in particular direction, whether another wind turbine is in a wake region caused by the considered wind turbine; if another wind turbine is in the wake region and if the other wind turbine is in an operable state, applying a first control setting to the considered wind turbine; if the other wind turbine is in a non-operable state applying a second control setting to the considered wind turbine, wherein the first control setting is based on wind park level optimisation and the second control setting is based on wind turbine level optimisation.

In particular, the first control setting has previously been determined for the given wind condition to optimize a first target function for the entire wind park based on a simulation model assuming that all wind turbines are operable, wherein in particular the second control setting has been previously determined for the given wind condition to optimize a second target function for only the considered wind turbine, in particular disregarding all other wind turbines.

The method may be performed for example by a park controller controlling plural wind turbines comprised in the wind park. Alternatively, the method may (at least) partly be performed by a respective wind turbine controller associated with each other wind turbine of the wind park. The considered wind turbine may be any wind turbine of the wind park and the method may in particular be applied (successively or in parallel) to all wind turbines of the wind park as considered wind turbines.

The wind condition may for example comprise a definition of wind speed and/or wind direction. The wind condition may be measured experimentally, by an anemometer or any suitable wind sensor.

In general, another wind turbine is in awake region caused by the considered wind turbine, if this other wind turbine is located downstream (in the direction of the current wind direction) of the considered wind turbine taking into account the diameter of the considered wind turbine (for example diameter of the rotor blades) and optionally allowing an expansion of the wind effected region downstream the considered wind turbine. Furthermore, the other wind turbine may be required to be located within a particular threshold distance away from the considered wind turbine to be considered to be located within the wake region and may be required to be the wind turbine closest to the considered wind turbine (e.g. if more than one wind turbines are in a region downstream the considered wind turbine).

The first setting is applied to the considered wind turbine, if the other wind turbine is in the wake region and at the same time the other wind turbine is in an operable state. The other wind turbine not necessarily has to produce electric energy or electric power but is in a condition of absence of any errors or failures such that the other wind turbine has all required components intact for producing electric energy. However, the local wind conditions may be such that the other wind turbine is at least not producing electric energy, such that the rotor may be spinning at very low speed not sufficient to output electric energy. In other circumstances, the other wind turbine may be in a normal operation condition, thus for example producing electric energy, in particular a nominal power output.

The second control setting is applied to the considered wind turbine, if the other wind turbine is in a non-operable state, for example is not able to produce electric energy due to an error or one or more faulty components.

The first control setting may be based on a simulation of the entire wind park, thus taking all wind turbines of the wind park into account for optimizing the first target function. The first target function and also the second target function may in particular comprise active power output and/or load.

The first and the second control settings may comprise a definition, such as set points, of one or more control parameters. The first control setting is different from the second control setting. The first control setting and the second control setting may comprise set points of same control parameters, but the values of the set points may be different, at least for one control parameter. The first control setting and/or the second control setting may have been previously determined or may be determined online during performing the method.

The second control setting may have been determined for the given wind condition solely taking into account the considered wind turbine, but in particular disregarding all other wind turbines of the wind park. Thus, this second control setting may substantially correspond to optimized values or set points of operating parameters of only the considered wind turbine, in particular optimized for power output and/or load, which is known for each wind turbine.

Both, the first control setting and/or the second control setting may have been determined previously (for different wind conditions). Thus, during performing the method, the respective control settings may be looked up for example from an electronic data structure, for example look-up table, depending on the current wind condition. Thereby, the method may be performed in a fast and reliable manner.

According to an embodiment of the present invention, the other wind turbine is in the operable state, if the other wind turbine is producing electrical power or at least could produce electrical power, if the wind condition was appropriate, wherein the other wind turbine is in the non-operable state, if the other wind turbine is stopped, in particular due to an error or due to maintenance.

The other wind turbine is in the operable state, for example if all components of the wind turbine required for producing electric energy are functional. The other wind turbine is for example non-operable if one or more components of the other wind turbines required for energy production are faulty or non-operable. In particular, the other wind turbine may have intentionally been stopped, such that the other wind turbine is not producing electric energy and in particular the rotor stands still. The other wind turbine may even be locked. The other wind turbine may have in this case a fault in at least one component required for energy production.

According to an embodiment of the present invention, the determining whether the other wind turbine is in the wake region comprises: utilizing a previously determined wind direction specific association of several other wind turbines to the considered wind turbine, which association designates one of the several other wind turbines to be in the wake region of the considered wind turbine depending on the wind direction.

The wind direction specific association (data structure) may be implemented for example in a particular data structure in a programming language. Such an association data structure may be associated to each wind turbine of the wind park. The association data structure may for a considered wind turbine comprise information which (if any) other wind turbine is in the wake region, depending on the wind direction. For example, the association data structure may define for a particular wind direction angle range that a particular other wind turbine is in the wake region, e.g. by associating a wind turbine identifier to the particular wind direction angle range. For another wind direction angle range, another other wind turbine may be in the wake region of the considered wind turbine.

For particular wind directions there may be none other wind turbines in the wake region of the considered wind turbine. If there are more than one other wind turbines within an angle range downstream the considered wind turbine, only the closest other wind turbine (i.e. this other wind turbine which has the smallest distance) to the considered wind turbine may be considered to be located within the wake region. Thus, the operational state for only one other wind turbine needs to be determined in order to decide which of the control settings, i.e. the first control setting or the second control setting, is to be applied to the considered wind turbine. The previously determined wind direction specific association data may be utilized to accelerate the method and also to simplify the method.

According to an embodiment of the present invention, the association data defines for each of several other wind turbines a wind direction angle sector for which the respective other wind turbine is considered to be in the wake region, wherein in particular, the other wind turbine is considered to be in the wake region, if the other wind turbine is located, depending on the wind direction, in a region downstream the considered wind turbine having a width of the diameter of the blades of the considered wind turbine, the width expanding downstream the considered wind turbine by an angle of between 2° and 6° on both sides, in particular and if a distance between the considered wind turbine and the other wind turbine is closer than threshold and/or the other wind turbine is the one closest to the considered wind turbine.

The association data structure may define, for the considered wind turbine, an identification of the other wind turbine which is in the wake region for a particular wind direction angle range. When the considered wind turbine or a central park controller has access to the identification or an identifier of the other wind turbine, also the operation state (at least comprising the statement operable or non-operable) may also then be obtained, for example by requesting the operational state from the other wind turbine. In general, a central park controller may continuously monitor and record the operational states of all wind turbines in the wind park. Thus, the central park controller may have access and knowledge to the operational state of all wind turbines in the wind park. Thereby, the method may be simplified.

In particular, the association data may comprise, for each considered wind turbine, one or more wind direction angle ranges related or associated to a respective other wind turbine, in particular identified by an identifier.

According to an embodiment of the present invention, the first and second target function both comprise power output and/or load, of the entire wind park and the considered wind turbine, respectively.

The first and/or second target function may allow to optimize the performance with respect to different aspects. In particular, a combination of several parameters may be formed. For example, a compromise in maximizing power output and minimizing loads may be defined within the target functions. The target function may in particular comprise (e.g. a weighted sum of) active power output and/or load. Thereby, a large flexibility is provided.

According to an embodiment of the present invention, the first and/or the second control setting comprises at least one set point of at least one parameter selected from: a rotor yaw angle, a rotor yaw offset, a rotor tilt angle, a rotational speed, a generator torque, an active power output, a reactive power output, at least one blade pitch angle, an active current, a reactive current. The set point may also be referred to as a reference, i.e. a value which is desired to be achieved. Thereby, the control settings may allow to accurately define the operational behaviour of the respective wind turbines.

According to an embodiment of the present invention, the first and the second control setting are different in at least one set point of at least one parameter, in particular different in a set point for the yaw offset. The first and the second control settings may comprise set points for same operational parameters, however, at least one set point may be different for the first and the second control setting.

According to an embodiment of the present invention, the second control setting comprises the set point of the yaw offset to be essentially zero, wherein the first control setting comprises the set point of the yaw offset to be different from zero.

The yaw offset may be defined as an angle (or angle indicative quantity) between the direction of the rotation shaft and the wind direction. For a single wind turbine (not comprised in a wind park), the yaw offset may typically be set to 0° in order to allow capturing the most amount of energy from the wind by the rotor blades. However, in a wind park comprising plural wind turbines, the yaw offset of an upstream wind turbine may set to a value different from zero, if this results in an overall improvement of the target function of the whole wind park, if for example the energy output of the other wind turbine in the wake region is considerably improved. If it is determined that the other wind turbine in the wake region of the considered wind turbine is actually non-operable, then it does not make sense to apply the wind park optimal setting, i.e. the first control setting, since this typically would involve to decrease power output and/or increase load of the considered wind turbine (to the presumed benefit of downstream wind turbine(s)), at least it would not optimize the second target function.

Thereby not applying a non-zero yaw offset may improve also operation of the entire wind park.

According to an embodiment of the present invention, the first control setting comprises the set point of blade pitch angle to be greater than the set point of the blade pitch angle of the second control setting. Also the blade pitch angle may be set to different values if the downstream wind turbine is operable or non-operable. In case the downstream is operating, the blades would be pitched out (i.e. a larger pitch angle is used) to increase the wind speed in its wake and thereby increase the production of the downstream turbine by reducing the shadow effect of the wind turbine. Thereby the production of the upstream turbine is reduced, so if the downstream turbine is not operating, a smaller blade pitch angle is used to prevent unnecessary losses.

According to an embodiment of the present invention, the second control setting is based on at least one set point of rotational speed, pitch angle, yaw angle, tilt angle, power production, a wind speed, each being selected for maximal power production of the considered wind turbine. Thus, for the second control setting, no complex simulation model modelling an entire wind park may be necessary to be applied. Merely, the characteristics of the considered wind turbine may be taken into account, such as optimal parameter curves, such as for pitch angle, rotational speed, etc. depending on the wind speed. Thereby, the method may be simplified.

According to an embodiment of the present invention, the method further comprises determining an operational state of the other wind turbine; communicating the operational state to the considered wind turbine, in particular via a park controller; in particular further comprising: determining the wind condition, in particular wind direction.

The operational state of each of the wind turbines of the wind park may be determined by requesting the operational state from the respective wind turbine. This may be done by for example a wind park controller or wind park processor. The operational state must not necessarily be communicated to the considered wind turbine. In other embodiments, the wind park controller may collect all required information and may also have access to the plural association data. The central controller may then look up, depending on the determined wind direction, for each considered wind turbine, which other wind turbine is in the wake region. The central controller may then look up the operational state of this particular other wind turbine. Depending on the result, the park controller may then supply the considered wind turbine with the appropriate control settings, i.e. the first or the second control setting depending on whether the other wind turbine is operable or non-operable.

The wind condition may be determined locally for each considered wind turbine and/or may be determined by a central facility.

The method may further comprise applying a wake model to the entire wind park determined previously to derive the first control setting. The wake model may model the influence of the operation of all wind turbines to the local wind condition and may also model power output of the wind turbine depending on the local wind conditions. A model such as disclosed or published in the PHD dissertation by Pieter Gebraad, TU Delft, 1 Dec. 2014 "Data-driven wind plant control" may for example be utilized. Other wake models may also be applied.

The method may in particular be performed for each wind turbine of the wind park.

It should be understood, that features, individually or in any combination, disclosed, described or explained in the context of a method for controlling at least one considered wind turbine in a wind park may also be applied, individually or in any combination, to an arrangement for controlling at least one considered wind turbine according to embodiments of the present invention and vice versa.

According to an embodiment of the present invention it is provided an arrangement for controlling at least one considered wind turbine in a wind park, the arrangement being adapted: to determine, based on a wind condition, whether another wind turbine is in a wake region caused by the considered wind turbine; to apply a first control setting to the considered wind turbine, if another wind turbine is in the wake region and if the other wind turbine is in an operable state, to apply a second control setting to the considered wind turbine, if the other wind turbine is in a non-operable state, wherein the first control setting is based on wind park level optimisation and the second control setting is based on wind turbine level optimisation.

The first control setting may have previously been determined for the given wind condition to optimize a first target function for the entire wind park based on a simulation model assuming that all wind turbines are operable, wherein the second control setting may have been previously determined for the given wind condition to optimize a second target function for only the considered wind turbine, in particular disregarding all other wind turbines.

The arrangement may for example be part of a wind park controller or may partly be comprised in a wind park controller and partly be comprised in one or more wind turbine controllers.

Further, a wind park comprising an arrangement for controlling at least one considered wind turbine in a wind park is provided.

The aspects defined above and further aspects of the present invention are apparent from the examples of embodiment to be described hereinafter and are explained with reference to the examples of embodiment. The present invention will be described in more detail hereinafter with reference to examples of embodiment but to which the present invention is not limited.

BRIEF DESCRIPTION

Figure 2:
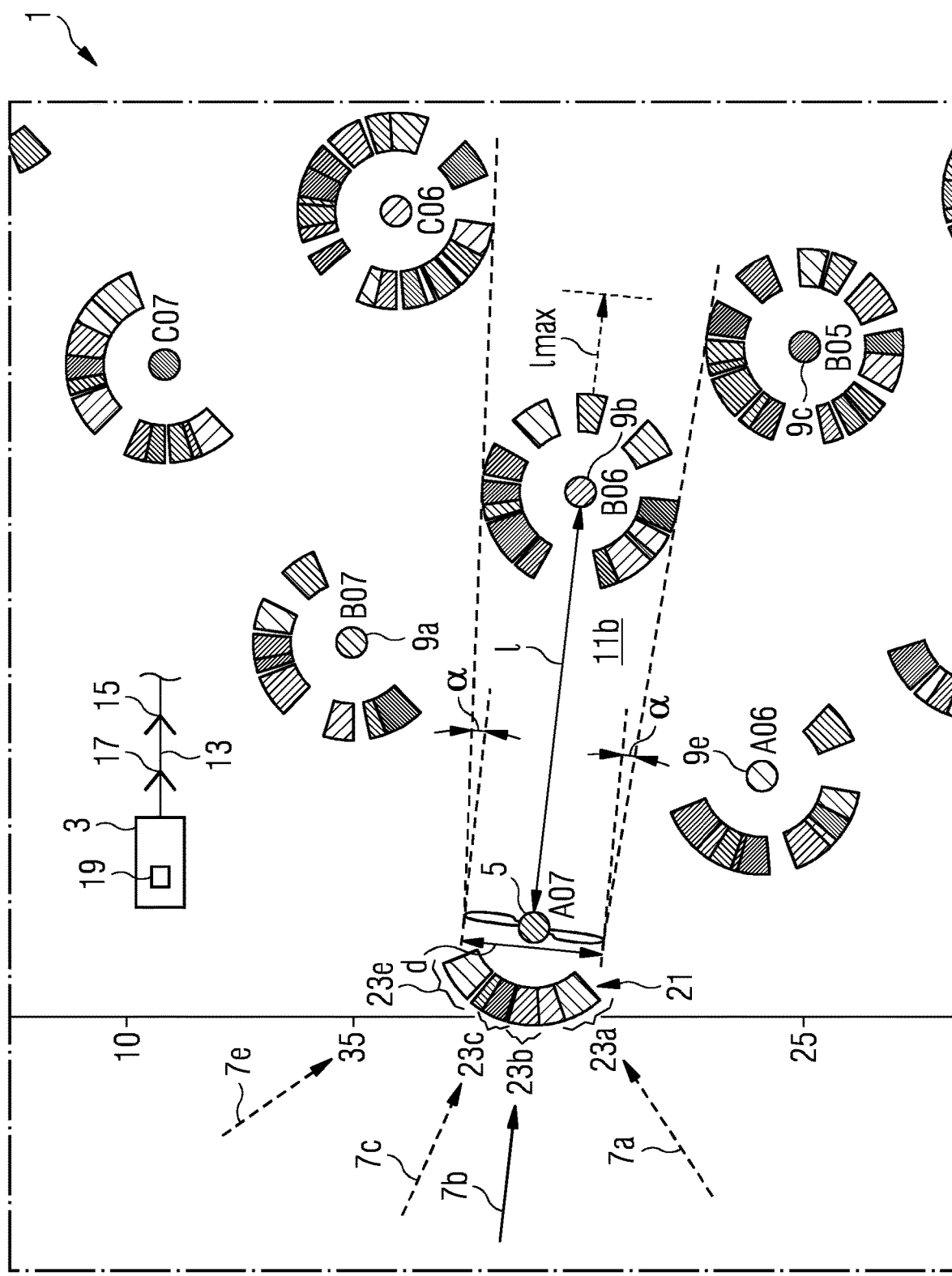

Some of the embodiments will be described in detail, with reference to the following figures, wherein like designations denote like members, wherein:

FIG. 1 depicts a wind park including an arrangement for controlling at least one considered wind turbine in the wind park which is adapted to perform a method; and FIG. 2 depicts a part of the wind park illustrated in FIG. 1.

DETAILED DESCRIPTION

The wind park 1 illustrated in FIG. 1 in a schematic plan view comprises plural wind turbines arranged substantially in a square area and labelled with reference signs A01 to A07 in a first row, B01 to B07 in a second row, . . . , and F01 to F07 in a last, sixth row. The wind park further comprises an arrangement 3 for controlling at least one considered wind turbine, for example wind turbine 5 (A07). Thereby, the arrangement 3 is adapted to determine, based on a wind direction 7 (7a, . . . , 7e denote examples of different wind directions), whether another wind turbine, for example one of the other wind turbines 9a (B07), 9b (B06), 9c (B05), 9d (B04) or 9e (A06) is in a wake region 11b caused by the considered wind turbine 5. In the present illustrated example, the other wind turbine 9b (B06) is located within the wake region 11b downstream the considered wind turbine 5 (A07) during the present wind condition, in which the wind blows in the direction 7b. For example, the other wind turbine 9a (B07) is in the respective wake region, if the wind blows in the direction 7a (and is closes to wind turbine 5). one of the other wind turbines 9b or 9c, 9d or 9e is in the wake region if the wind blows in the direction 7b, 7c, 7d and 7e, respectively, as indicated by dashed wind directions.

The arrangement is further configured to determine or request the operational states of the other wind turbines 9a, . . . , 9e which are potentially in the wake region depending on the wind direction. Therefore, the arrangement 3 is communicatively connected to all wind turbines of the wind park using a network connection 13. Furthermore, the arrangement 3 comprises a control output module which may also utilize the network connection 13 in order to supply control signals to all wind turbines in the wind park 1.

For example, in one scenario, the other wind turbine 9b within the wake region 11b is in an operable state, for example running and producing energy. In this case, the arrangement 3 supplies to the considered wind turbine 5 (A07) first control setting in order to control the operation of the considered wind turbine 5. If, however, the other wind turbine 9b (B06) is in a non-operable state, the arrangement 3 applies second control setting to the considered wind turbine 5.

FIG. 2 illustrates a portion of the wind park in more detail. The first control setting denoted by signal 15 in FIG. 2 has been determined for the given wind condition (for example characterized by the wind direction 7b) and also based on the wind speed, to optimize a first target function for the entire wind park 1 based on a simulation model assuming that all wind turbines are operable.

The second control setting, denoted by a control signal 17 in FIG. 2, has been determined for the given wind condition to optimize a second target function for only the considered wind turbine 5 (A07) without taking into account load and/or energy production of all other wind turbines of the wind park 1.

For determining whether the other wind turbine (for example 9b (B06)) is in the wake region 11b (depending on the current wind direction 7b), the arrangement 3 may have (for every wind turbine in the wind park) a wind direction specific association data structure 21 stored within an electronic storage 19. The association data structure 21 may, for each considered wind turbine 5, designate one of the several other wind turbines, for example the wind turbines 9a, . . . , 9e, to be in the wake region for the considered wind turbine depending on the wind direction 7b or 7a, . . . , 7e.

The respective association data structure 21 stored for each wind turbine of the wind park within the arrangement 3 is illustrated in a graphical manner as differently shaded angle sector map 21. In particular, the association data structure 21 comprises for each of several other wind turbines 9a, . . . , 9e a respective wind direction angle sector 23a, . . . , 23e, in a suitable format. The kind of shading in one wind direction angle sector is the same as applied to the dot showing the respective wind turbine.

For example, when the wind direction 7 is within an angle range covered by the wind direction angle sector 23a, the other wind turbine 9a (B07) would be considered to be in the wake region of the upstream wind turbine 5. For the wind direction 7b, however, the respective wind direction angle sector 23b identifies the other wind turbine 9b (B06) as the wind turbine within the wake region 11b. The association data structure 21 may be implemented in any suitable manner, such as a suitable data object or data table or database. The association data structure 21 may merely define an identity of the respective downstream wind turbine which is in the wake region for a wind direction angle range.

The wake region 11b may cover an area defined by the diameter d of the rotor blades of the considered wind turbine 5 which extends downstream the wind turbine 5 thereby, expanding the width w by an angle of between 2° and 6°, wherein the angle is denoted as α in FIG. 2. Other definitions are possible.

Furthermore, if several other wind turbines are within the thus defined cone, only the wind turbine closest to the considered wind turbine is considered to be within the wake region. Further, the wake region 11b does not need to extend indefinitely downstream the considered wind turbine 5 but may end at a maximal distance lmax from the wind turbine.

Both the first and the second control setting may comprise at least one set point of an operational parameter wherein, however, at least one value of the set point may be different.

According to an embodiment of the present invention, the control method may adapt to the situation that a turbine is stopped (or at least non-operable) by performing one or more of the following steps:

1) For each turbine A (for example wind turbine 5) in the wind farm, based on the wind direction (for example 7b) and the layout of the wind farm 1, determine which downstream turbines (for example which of the downstream turbines 9a, . . . , 9e) are effected by the turbine A through its wake (for example wake region 11b), in particular using some assumptions on the direction of the wake and its expansion in the flow downstream.

2) Check which of those downstream turbines is at the closest distance to turbine A along the wind direction. In the illustrated example, this is wind turbine 9b (B06). This closest wind turbine may be referred to as turbine B. These steps 1) and 2) may be performed beforehand offline and a mapping (for example the mapping 21 illustrated in FIG. 2) defining the closest downstream turbine for each wind direction could be stored on each turbine individually or at the arrangement 3, for example.

3) Perform a communication between turbines, to determine if the turbine B (for example turbine 9b) is operating (or at least operable) or stopped/stopping, because for example of a maintenance or because of an error in one of an essential component.

4) In case that the closest downstream turbine B is stopped, set the control settings of turbine A to the control settings that are optimal on the individual turbine level (i.e. the second control setting) thereby ignoring the wake effects of any downstream turbines. If turbine B is operating (or at least operable) use on turbine A the control settings that are optimal on the wind farm level assuming that all wind turbines are operating (or at least operable).

This approach follows from the simplifying assumption that for determining the optimal control settings, all wake interaction effects can be ignored, if the closest downstream turbine is stopped (or for example non-operable). This assumption follows from the fact that the distances between turbines and wind farm are generally large enough such that the wake will have recovered too close to the free stream conditions when they reach the turbines further downstream. In particular, wake interaction effects between turbine A and a turbine further downstream from turbine B may be negligible.

The association data structure 21 illustrates a mapping from wind direction to the closest downstream turbine for each turbine in a wind farm. Each turbine may be indicated by a code and/or identified by an identifier, for example A07 for the considered wind turbine 5 and also all the other wind turbines may be identified by a code or an identifier.

Further, in the illustration of FIGS. 1 and 2, each wind turbine is associated with a colour or a particular hatching type. The semi-circle sectors 21 around the dots indicate which turbine is the closest downstream turbine for each wind direction, using the same hatching type as use to fill the dot denoting the respective wind turbine. The wind direction is shown in a clockwise direction from due North and so a wind coming from the South have a wind direction of 180° and one from the East has 90°. When for example going from Southwest to North wind direction, the closest downstream turbine impacted by the wake of turbine A07 is first turbine B07 and then as the wind direction increases, respectively C06, B06, B05, B04 and A06.

The embodiments of the present invention may provide several advantages. The adaptation of the control settings to the case of one or more stopped (or non-operable) turbines within the wind farm level optimized wake control may result in a wind farm performance increase (increased electrical energy production and/or reduced wind turbine loads) compared to the case where the fact that some turbines could be stopped were ignored. Very little computational cost of dealing with the case of stopped (or at least non-operable) wind turbines within the wind farm level optimized wake control.

Embodiments of the present invention may comprise to determine the wind direction. This could be the local wind direction measured at the wind turbine or the wind direction of the inflow into the wind farm that could be determined by conventional methods for estimation of free stream inflow wind conditions in a wind farm. Based on the wind direction, a simple wake modelling algorithm may be applied, which may merely determine a wake expansion and direction, for example for determining the location and shape of the wake regions 11. The methodology may be retrofitted to existing wind parks.

A simple, widely-used wake model with a linear expansion of the wake that may be used in embodiments of the present invention is e.g. described in "A SIMPLE MODEL FOR CLUSTER EFFICIENCY" by I. KATIC. J. HØJSTRUP. N. O. JENSEN, European Wind Energy Association Conference and Exhibition 7-9 Oct. 1986, Rome, Italy.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for controlling at least one considered wind turbine in a wind park, the method comprising:
   determining, based on a wind condition, whether another wind turbine is in a wake region caused by the at least one considered wind turbine;
   sending a first control signal to control an operation of the at least one considered wind turbine as a function of determining that if the other wind turbine is a closest wind turbine in the wake region, with respect to the at least one considered wind turbine, and the other wind turbine is in an operable state, wherein the first control signal includes a first control setting defining a set point of one or more control parameters;
   sending a second control signal to control the operation of the at least one considered wind turbine as a function of determining that the other wind turbine is the closest wind turbine and the other wind turbine is in a non-operable state, wherein the second control signal includes a second control setting defining a set point of the one or more control parameters; and wherein the first control setting is based on wind park level optimisation and the second control setting is based on wind turbine level optimisation.

2. The method according to claim 1:

wherein the first control setting has previously been determined for the given wind condition to optimize a first target function for the entire wind park based on a simulation model assuming that all wind turbines are operable;

wherein the second control setting has been previously determined for the given wind condition to optimize a second target function for only the considered wind turbine;

wherein the other wind turbine is in the operable state if the other wind turbine is producing electrical power;

wherein the other wind turbine is in the non-operable state if the other wind turbine is stopped, due to an error or due to maintenance.

3. The method according to claim 2, wherein the first and second target function both comprise power output and/or load, of the entire wind park and the considered wind turbine, respectively.

4. The method according to claim 1, wherein the determining whether the other wind turbine is in the wake region comprises:

utilizing a previously determined wind direction specific association of several other wind turbines to the considered wind turbine, which association designates one of the several other wind turbines to be in the wake region of the considered wind turbine depending on the wind direction.

5. The method according to claim 4, wherein:

the association defines for each of the several other wind turbines a wind direction angle sector for which the respective other wind turbine is considered to be in the wake region;

wherein the other wind turbine is considered to be in the wake region, if the other wind turbine is located, depending on the wind direction, in a region downstream the considered wind turbine having a width of the diameter of the blades of the considered wind turbine, the width expanding downstream the considered wind turbine by an angle of between 2° and 6° on both sides; and if a distance between the considered wind turbine and the other wind turbine is closer than threshold.

6. The method according to claim 1, wherein the one or more control parameters at least one parameter selected from: a rotor yaw angle, a rotor yaw offset, a rotor tilt angle, a rotational speed, an active power output, a reactive power output, at least one blade pitch angle, an active current, a reactive current.

7. The method according to claim 1, wherein the first control setting and the second control setting are different in at least one set point of a yaw offset.

8. The method according to claim 1, wherein the second control setting comprises a set point of a yaw offset to be essentially zero;

wherein the first control setting comprises a set point of the yaw offset to be different from zero.

9. The method according to claim 1, wherein the first control setting comprises a set point of a blade pitch angle to be greater than a set point of the blade pitch angle of the second control setting.

10. The method according to claim 1, wherein the second control setting is based on at least one set point of rotational speed, pitch angle, yaw angle, a wind speed, each being selected for maximal power production of the considered wind turbine.

11. The method according to claim 1, further comprising:

determining an operational state of the other wind turbine;

communicating the operational state to the at least one considered wind turbine, via a park controller; and determining the wind condition.

12. The method according to claim 1, further comprising:

applying a wake model to the wind park determined previously to derive the first control setting.

13. A method for controlling wind turbines in a wind park, comprising:

performing for each wind turbine of the wind park the method according to claim 1 as considered wind turbine.

14. An arrangement for controlling at least one considered wind turbine in a wind park, the arrangement configured:

to determine, based on a wind condition, whether another wind turbine is in a wake region caused by the considered wind turbine;

to send a first control signal to control an operation of the at least one considered wind turbine as a function of determining that the other wind turbine is a closest wind turbine in the wake region, with respect to the at least one considered wind turbine and that the other wind turbine is in an operable state, wherein the first control signal includes a first control setting defining a set point of one or more control parameters;

to send a second control signal to control the operation of the at least one considered wind turbine as a function of determining that the other wind turbine is in a non-operable state, wherein the second control signal includes a second control setting defining a set point of the one or more control parameters; and wherein the first control setting is based on wind park level optimisation and the second control setting is based on wind turbine level optimisation.

15. The wind park comprising an arrangement according to claim 14.

* * * * *